United States Patent
Zheng

(10) Patent No.: US 8,362,753 B2
(45) Date of Patent: Jan. 29, 2013

(54) SWITCHING POWER SUPPLY CIRCUIT

(75) Inventor: Jie-Jian Zheng, Shenzhen (CN)

(73) Assignees: Innocom Technology (Shenzhen) Co., Ltd., Shenzhen (CN); Chimei Innolux Corporation, Miaoli County (TW)

( * ) Notice: Subject to any disclaimer, the term of this patent is extended or adjusted under 35 U.S.C. 154(b) by 494 days.

(21) Appl. No.: 12/728,269

(22) Filed: Mar. 21, 2010

(65) Prior Publication Data

US 2011/0062923 A1    Mar. 17, 2011

(30) Foreign Application Priority Data

Sep. 17, 2009  (CN) .......................... 2009 1 0307137

(51) Int. Cl.
*G05F 1/40*      (2006.01)
*H02M 1/12*     (2006.01)

(52) U.S. Cl. ........ 323/282; 323/271; 323/266; 323/299; 363/39

(58) Field of Classification Search .................. 323/266, 323/271, 282–287, 299–303; 363/39–47
See application file for complete search history.

(56) References Cited

U.S. PATENT DOCUMENTS

| 5,471,378 | A  | * | 11/1995 | King | 363/46 |
| 5,491,403 | A  | * | 2/1996 | Lin | 323/282 |
| 6,584,000 | B1 | * | 6/2003 | Lee | 363/133 |
| 7,598,717 | B2 | * | 10/2009 | O'Meara | 323/283 |
| 2009/0140708 | A1 | * | 6/2009 | Tateishi et al. | 323/282 |
| 2009/0284993 | A1 | * | 11/2009 | Zheng et al. | 363/21.08 |

* cited by examiner

*Primary Examiner* — Jessica Han
(74) *Attorney, Agent, or Firm* — WPAT PC; Justin King

(57) ABSTRACT

A switching power supply circuit includes a power circuit, a switching circuit and a load. The switching circuit includes a first filter module, a power processing unit, a stability module, and a second filter module. The first filter module receives a voltage signal from the power circuit and sends a filtered first voltage signal to the power processing unit; the power processing unit outputs a second voltage signal, the stability module stabilizes the second voltage signal and sends a third voltage signal to the second filter module; the second filter module filters the third voltage signal and sends a drive voltage to the load. In response to the second voltage signal instantaneously changing from high to low or low to high, during the change in current, power of the second voltage signal is stored in the stability module and released through the second filter module.

23 Claims, 4 Drawing Sheets

SWITCHING POWER SUPPLY CIRCUIT

BACKGROUND

1. Technical Field

The present disclosure relates to power supply circuit, and more particularly to a switching power supply circuit.

2. Description of Related Art

Switching power supply circuits are widely used in various electronic devices, such as liquid crystal display (LCD) monitors and televisions, for example.

Referring to FIG. 4, a typical switching power supply circuit 100 includes a power circuit 110, a switching circuit 101 and a load 130. The switching circuit 101 includes a power processing unit 120, a voltage divider circuit 150, a first filter circuit 160, a second filter circuit 170, and a capacitor C863. The first filter circuit 160, the power processing unit 120, and the second filter circuit 170 are electrically connected in series. The voltage divider circuit 150 includes a first resistor R885 and a second resistor R886. The first resistor R885 and the second resistor R886 are electrically connected in series between the load 130 and ground.

The power circuit 110 sends a DC voltage signal VDC to the first filter circuit 160. The first filter circuit 160 filters the voltage signal VDC to a stable signal VDC1, and sends the stable signal VDC1 to an input terminal Vin of the power processing unit 120. An output terminal Vout of the power processing unit 120 outputs an output voltage signal VDC2. The power processing unit 120 charges the capacitor C863, and the value of the output voltage signal VDC2 is increased gradually to substantially equal the value of the voltage signal VDC. The second filter circuit 170 filters the output voltage signal VDC2 to a driving voltage signal VDO. The driving voltage signal VDO is divided to generate a feedback voltage VDC3 through the voltage divider circuit 150, and the feedback voltage VDC3 is input to a feedback terminal FB of the power processing unit 120. The power processing unit 120 compares the feedback voltage VDC3 with a reference voltage Vref, if the feedback voltage VDC3 exceeds the reference voltage Vref, the output voltage signal VDC2 is forced into cutoff. If the feedback voltage VDC3 is lower than the reference voltage Vref, the output voltage signal VDC2 is forced into output.

The output voltage signal VDC2 instantaneously changes from high to low or low to high, however, the change of the current of the output voltage signal VDC2 is not instantaneous. During the gradual change of the current, the power of the output voltage signal VDC2 is dissipated. When the change of the output voltage signal VDC2 is at a high frequency, the power loss is more serious. The power dissipates in the form of heat, the circuit elements are easy to overheat and burn out.

What is needed is to provide a switching power supply circuit that can overcome the described deficiencies.

BRIEF DESCRIPTION OF THE DRAWINGS

Many aspects of the present switching power supply circuit can be better understood with reference to the following drawings. The components in the various drawings are not necessarily drawn to scale, the emphasis instead being placed upon clearly illustrating the principles of the present switching power supply circuit.

DETAILED DESCRIPTION

Figure 1:
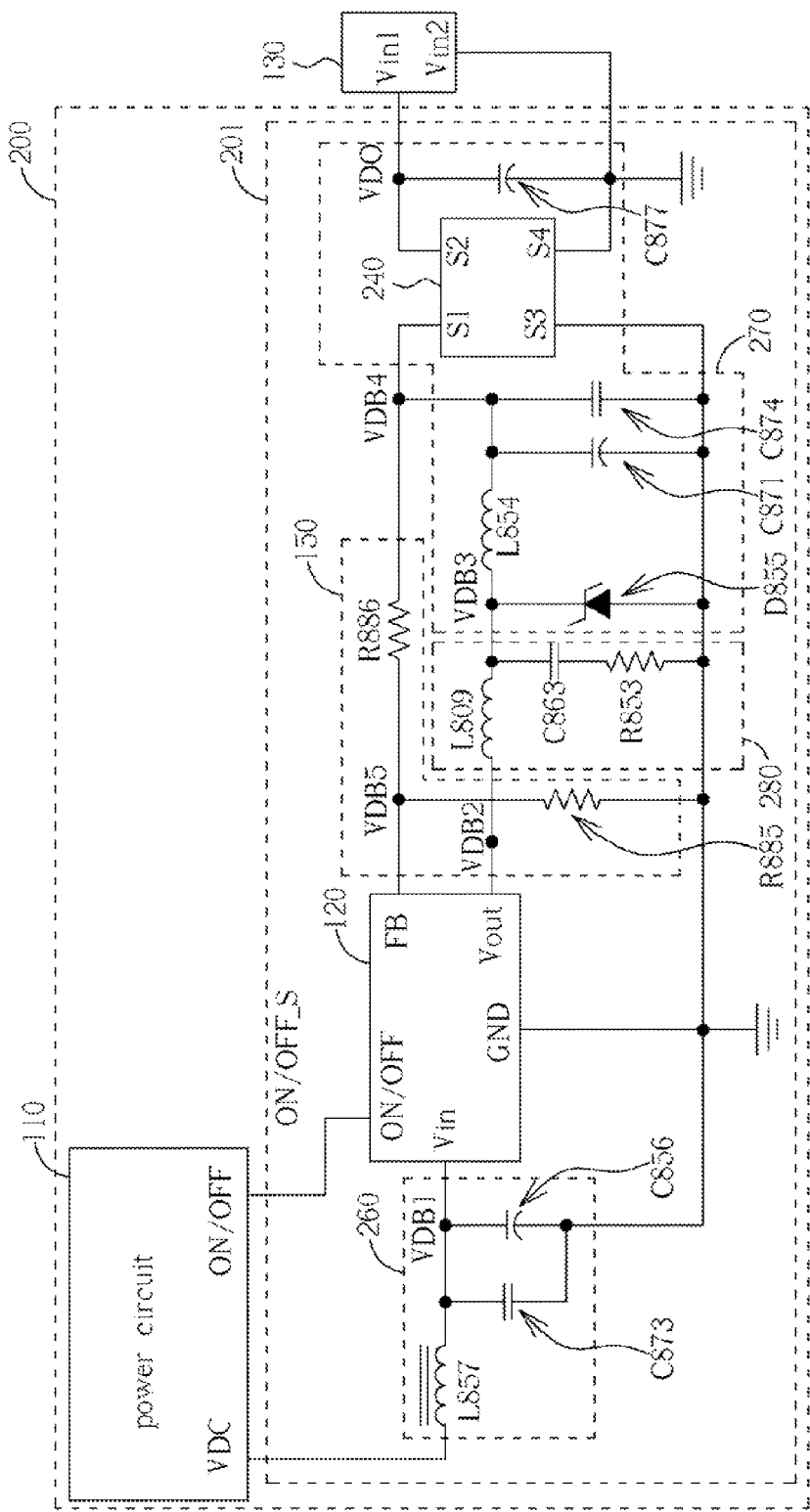
FIG. 1 is a schematic diagram of a switching power supply circuit according to a first embodiment of the present disclosure.

FIG. 1 shows a switching power supply circuit 200 according to a first embodiment of the present disclosure. The switching power supply circuit 200 includes the power circuit 110, a switching circuit 201 and the load 130. The power circuit 110, the switching circuit 201 and the load 130 are electrically connected in series.

The switching circuit 201 includes a first filter module 260, a second filter module 270, a stability module 280, the power processing unit 120 and the voltage divider circuit 150. The power processing unit 120 includes a ground. The first filter module 260 includes a first inductor L857, a first capacitor C873, and a second capacitor C856. The first inductor L857 and the first capacitor C873 are electrically connected in series between the power circuit 110 and the ground. The first capacitor C873 and the second capacitor C856 are electrically connected in parallel. The capacitance of the first capacitor C873 is lower than the capacitance of the second capacitor C856.

The second filter module 270 includes a second inductor L854, a third capacitor C871, a fourth capacitor C874, a diode D855, a transformer 240, and a fifth capacitor C877. In one embodiment, the diode D855 can be a zener diode. The second inductor L854, the third capacitor C871, and the diode D855 constitute a loop. The third capacitor C871 and the fourth capacitor C874 are electrically connected in parallel. The capacitance of the third capacitor C871 exceeds the capacitance of the fourth capacitor C874.

The transformer 240 includes a primary winding and a secondary winding; the primary winding includes a first terminal S1 and a second terminal S2, the secondary winding includes a third terminal S3 and a fourth terminal S4. The first terminal S1 is electrically connected to the third capacitor C871. The second terminal S2 is electrically connected to an input terminal Vin1 of the load 130. The third terminal S3 and the fourth terminal S4 are both electrically connected to the ground. The fifth capacitor C877 is electrically connected between the second terminal S2 and the ground.

The stability module 280 includes a third inductor L809, a sixth capacitor C863 and a third resistor R853. The third inductor L809, the sixth capacitor C863 and the third resistor R853 are electrically connected in series between the output terminal Vout and the ground.

The first resistor R885 is connected between the feedback terminal FB and the ground. The second resistor R886 is connected between the feedback terminal FB and the first terminal S1.

The power circuit 110 sends a DC voltage signal VDC to the first filter module 260. The first inductor L857 stabilizes the current of the voltage signal VDC. The first capacitor C873 filters the high frequency noise of the voltage signal VDC, and the second capacitor C856 filters the low frequency noise of the voltage signal VDC. The first filter module 260 sends a stable first voltage signal VDB1 to the input terminal Vin of the power processing unit 120. The output terminal Vout of the power processing unit 120 outputs a second voltage signal VDB2. The stability module 280 receives the second voltage signal VDB2 and outputs a third voltage signal VDB3. When the voltage value of the output terminal Vout instantaneously changes from low to high, the third inductor L809 stabilizes the current of the stability module 280, the sixth capacitor C863 stabilizes the voltage of the stability module 280; and the third voltage signal VDB3 is gradually increased.

The third voltage signal VDB3 is filtered by the second filter module 270, and converted to a fourth voltage signal VDB4. With stable elements as the second inductor L854, the third capacitor C871 and the fourth capacitor C874, the fourth voltage signal VDB4 is gradually increased. The transformer 240 receives the fourth voltage signal VDB4, and the fourth voltage signal VDB4 is filtered by the primary winding and the fifth capacitor C877. The second terminal S2 sends a drive voltage VDO to the input terminal Vin1 of the load 130. The fourth voltage signal VDB4 is divided into a feedback voltage VDB5 through the voltage divider circuit 150. The feedback voltage VDB5 is input to the feedback terminal FB of the power processing unit 120.

The power processing unit 120 compares the feedback voltage VDB5 with a reference voltage Vref, the reference voltage Vref equaling or slightly lower than the value of the drive voltage VDO divided by the voltage divider circuit 150. If the feedback voltage VDB5 exceeds the reference voltage Vref, the second voltage signal VDB2 is forced into cutoff as there is no voltage output from the output terminal Vout. If the feedback voltage VDB5 is lower than the reference voltage Vref, the second voltage signal VDB2 is forced into output. When the second voltage signal VDB2 instantaneously changes from high to low, when current of the second voltage signal VDB2 decreases, the power of the second voltage signal VDB2 is stored in the third inductor L809 and the sixth capacitor C863. The stored power can be released through the loop constituted by the second inductor L854, the third capacitor C871, and the diode D855.

Figure 2:
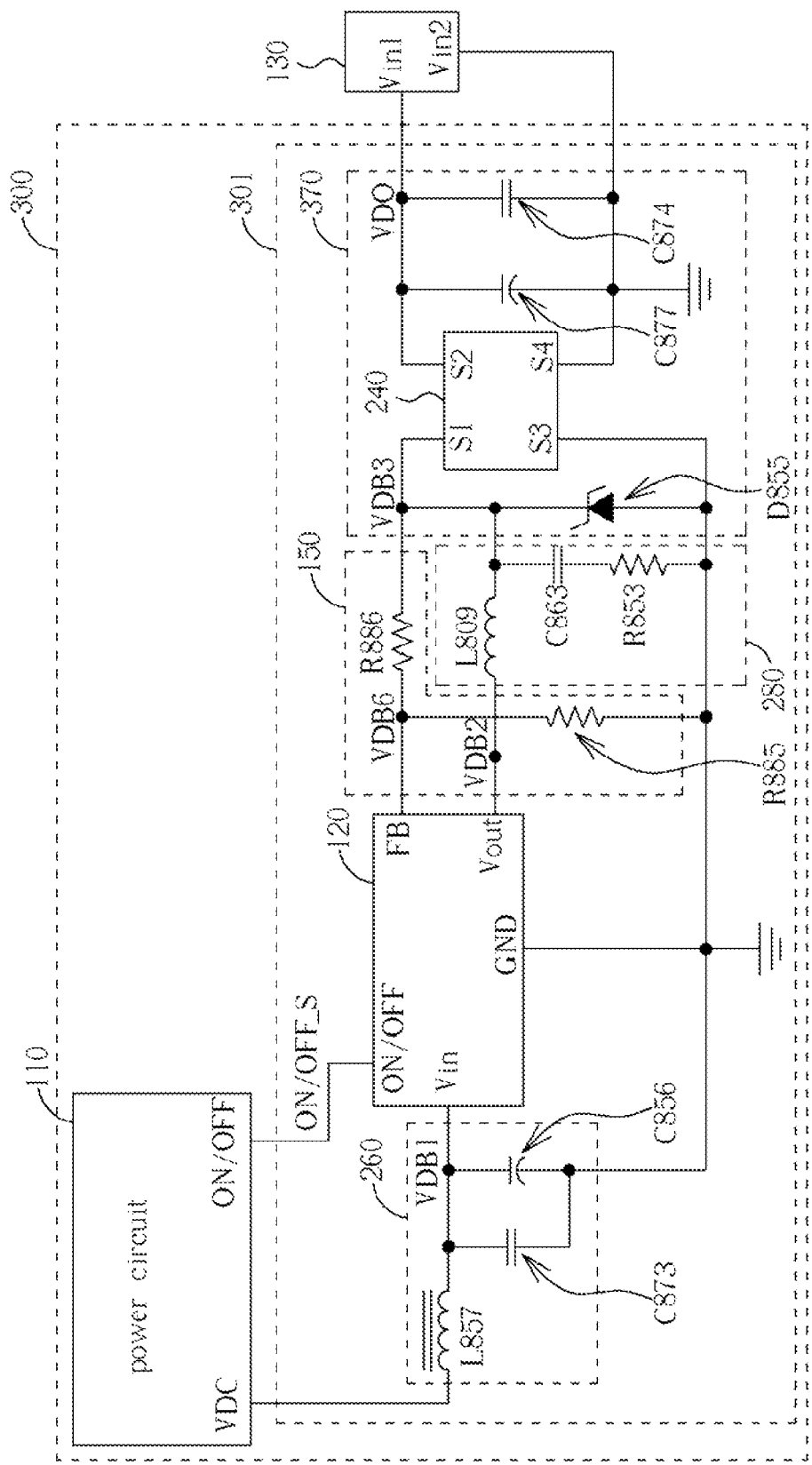
FIG. 2 is a schematic diagram of a switching power supply circuit according to a second embodiment of the present disclosure.

Referring to FIG. 2, a switching power supply circuit 300 according to a second embodiment of the present disclosure is shown, differing from the power supply circuit 200 in that a second filter module 370, the second inductor L854 and the third capacitor C871 are omitted; the fourth capacitor C874 and the fifth capacitor C877 are electrically connected in parallel; the third voltage signal VDB3 is divided into a feedback voltage VDB6 through the voltage divider circuit 150; and the stored power can be released through a loop constituted by the fifth capacitor C877, the transformer 240, and the diode D855.

Figure 3:
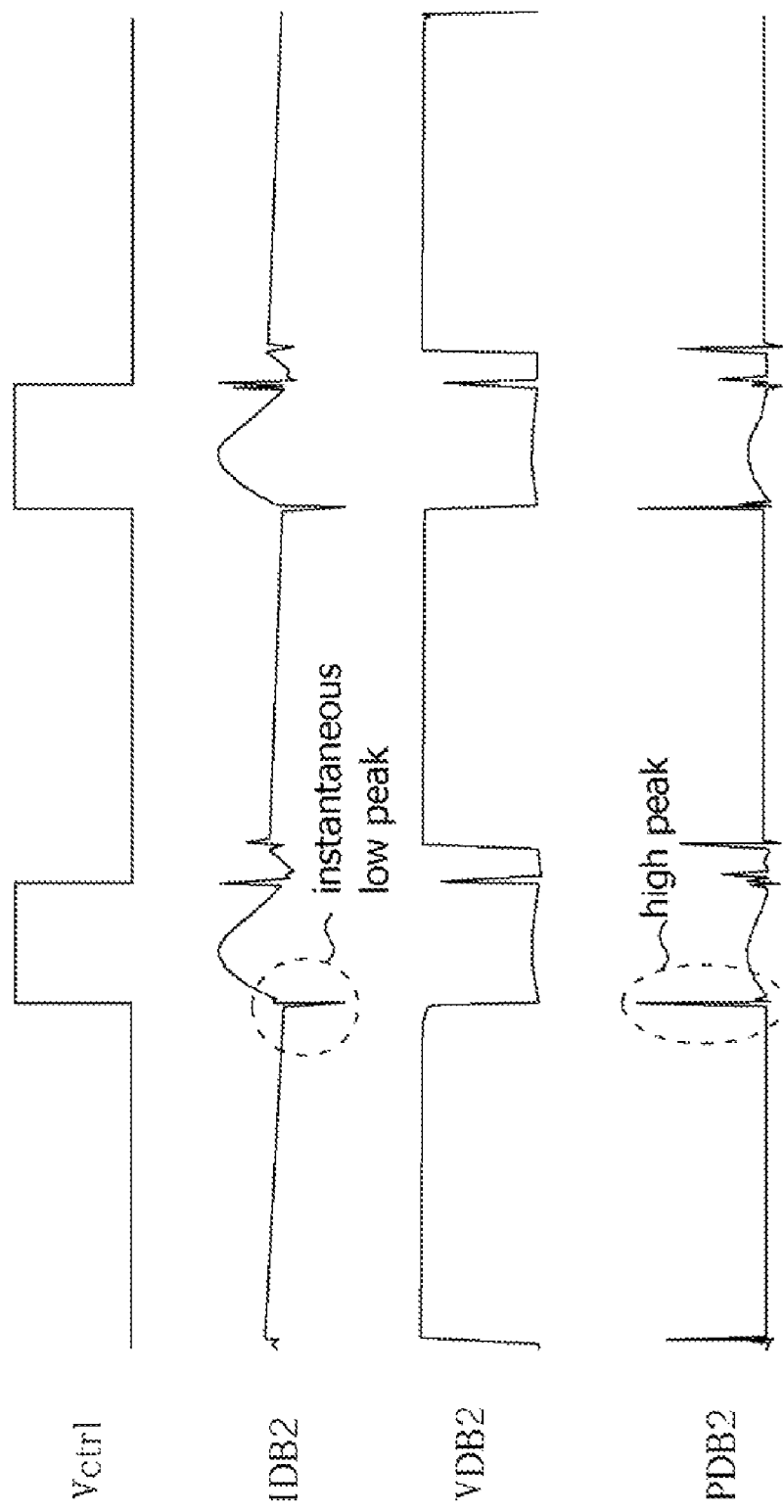
FIG. 3 is an exemplary waveform of an output terminal of a power processing unit shown in FIG. 1 and FIG. 2.
Figure 4:
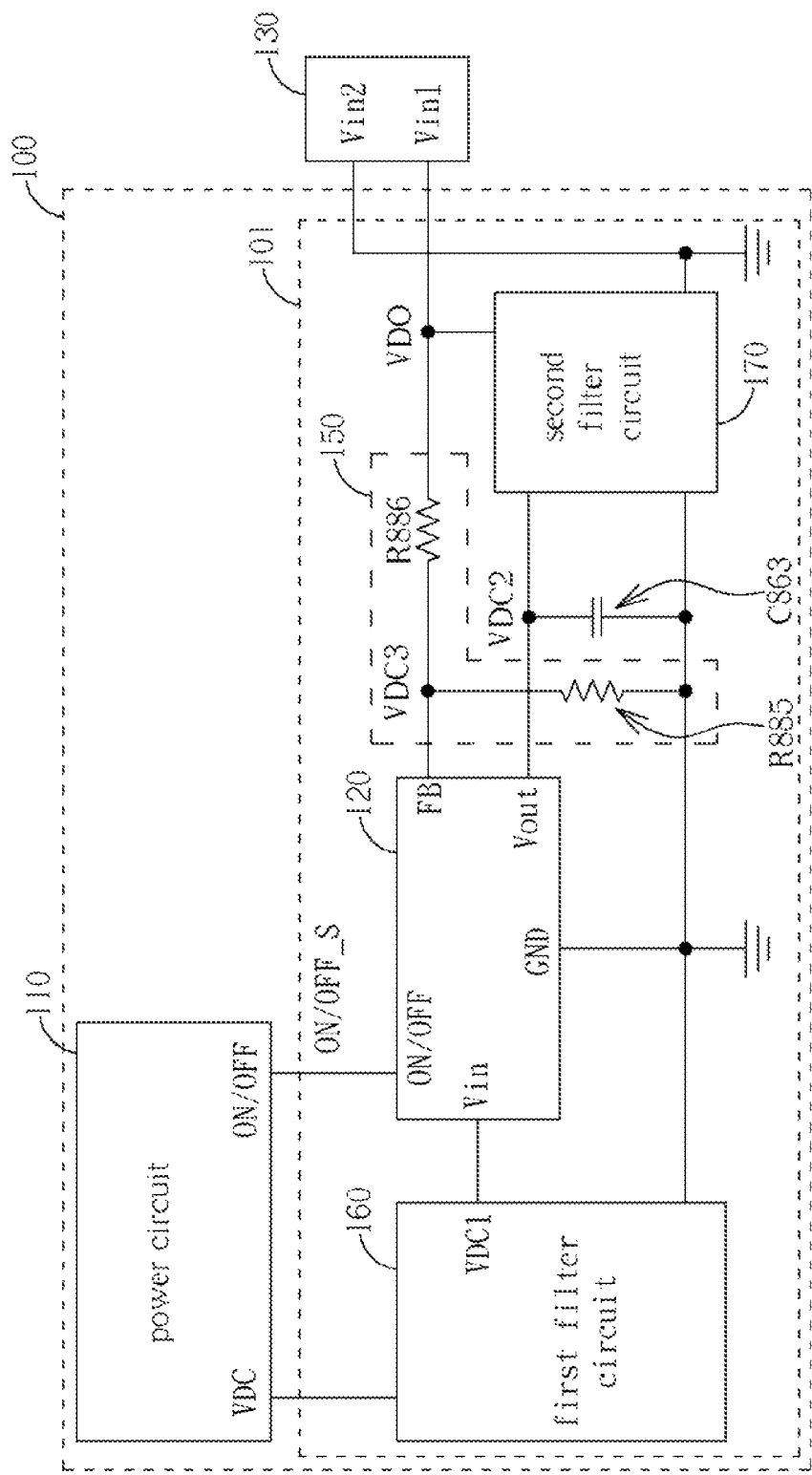
FIG. 4 is a diagram of a conventional switching power supply circuit.

Referring to FIG. 3, according to comparison between the feedback voltage VDB5/VDB6 and the reference voltage Vref, the power processing unit 120 generates a control voltage Vctrl. If the feedback voltage VDB5/VDB6 is lower than the reference voltage Vref, the control voltage Vctrl is at low level (e.g., logical 0); if the feedback voltage VDB5/VDB6 exceeds the reference voltage Vref, the control voltage Vctrl is at high level (e.g., logical 1). When the control voltage Vctrl changes from low to high, the second voltage signal VDB2 instantaneously changes from high to low, creating an instantaneous low peak on the waveform of the current IDB2, and an instantaneous high peak on the waveform of a power PDB2. The third inductor L809 stabilizes the current IDB2 and the power of the high peak is stored in the third inductor L809 and the sixth capacitor C863. When the control voltage Vctrl changes from high to low, the second voltage signal VDB2 instantaneously changes from low to high, an instantaneous high peak is formed on the waveform of the current IDB2, and an instantaneous high peak is formed on the waveform of the power PDB2. The third inductor L809 stabilizes the current IDB2 and the power of the high peak is stored in the third inductor L809 and the sixth capacitor C863.

According to the stability module 280 and the second filter module 270, during the decrease in current, the power can be stored in the inductor and the capacitor and released through a loop.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A switching power supply circuit, comprising:
a power circuit;
a switching circuit including a first filter module, a power processing unit, a stability module, and a second filter module; and
a load;
wherein the first filter module receives a voltage signal from the power circuit and sends a filtered first voltage signal to the power processing unit; the power processing unit outputs a second voltage signal, the stability module stabilizes the second voltage signal and sends a third voltage signal to the second filter module; the second filter module filters the third voltage signal and sends a drive voltage to the load; and
in response to the second voltage signal instantaneously changing from high to low or low to high, during the change in current, power of the second voltage signal is stored in the stability module and released through the second filter module.

2. The switching power supply circuit as claimed in claim 1, wherein the power processing unit includes an output terminal and a ground, the stability module includes a first inductor, a first capacitor and a first resistor, the first inductor, the first capacitor and the first resistor are connected in series between the output terminal and the ground.

3. The switching power supply circuit as claimed in claim 2, wherein the second filter module includes a second inductor, a second capacitor, and a diode; the second inductor, the second capacitor, and the diode constituting a loop by which the power of the second voltage signal is released; wherein the first inductor and the second inductor are connected in series and the diode and the first capacitor are connected in parallel.

4. The switching power supply circuit as claimed in claim 3, wherein the diode is a zener diode.

5. The switching power supply circuit as claimed in claim 4, wherein the second filter module further includes a transformer including a primary winding and a secondary winding; the primary winding includes a first terminal and a second terminal, the secondary winding includes a third terminal and a fourth terminal; the first terminal is connected to the second capacitor; the second terminal is connected to an input terminal of the load; the third terminal and the fourth terminal are both connected to the ground.

6. The switching power supply circuit as claimed in claim 5, wherein a third capacitor is connected between the second terminal and the ground.

7. The switching power supply circuit as claimed in claim 6, wherein the first filter module includes a third inductor, a fourth capacitor, and a fifth capacitor; the third inductor and the fourth capacitor are connected between the power circuit and the ground; the fourth capacitor and the fifth capacitor are connected in parallel.

8. The switching power supply circuit as claimed in claim 6, wherein the switching power supply circuit further includes a voltage divider circuit, the third voltage signal filtered by the filter module is divided into a feedback voltage through the voltage divider circuit; and the feedback voltage is input to a feedback terminal of the power processing unit.

9. The switching power supply circuit as claimed in claim 8, wherein the power processing unit compares the feedback voltage with a reference voltage, and in response to the feedback voltage exceeding the reference voltage, the second voltage signal is forced into cutoff; and in response to the feedback voltage being lower than the reference voltage, the second voltage signal is forced into output.

10. The switching power supply circuit as claimed in claim 9, wherein the reference voltage is equal to the drive voltage divided by the voltage divider circuit.

11. The switching power supply circuit as claimed in claim 2, wherein the second filter module includes a diode, a transformer, and a second capacitor constituting a loop by which the power is released; wherein the diode is connected to the first inductor.

12. The switching power supply circuit as claimed in claim 11, wherein the diode is a zener diode.

13. The switching power supply circuit as claimed in claim 12, wherein the transformer includes a primary winding and a secondary winding; the primary winding includes a first terminal and a second terminal, the secondary winding includes a third terminal and a fourth terminal; the first terminal is connected to the zener diode; the second terminal is connected to an input terminal of the load; and the third terminal and the fourth terminal are both connected to the ground.

14. The switching power supply circuit as claimed in claim 13, wherein the switching power supply circuit further includes a voltage divider circuit, the third voltage signal is divided into a feedback voltage through the voltage divider circuit; and the feedback voltage is input to a feedback terminal of the power processing unit.

15. The switching power supply circuit as claimed in claim 14, wherein the power processing unit compares the feedback voltage with a reference voltage, and if the feedback voltage exceeds the reference voltage, the second voltage signal is forced into cutoff; and if the feedback voltage is lower than the reference voltage, the second voltage signal is forced into output.

16. The switching power supply circuit as claimed in claim 15, wherein the reference voltage is equal to the drive voltage divided by the voltage divider circuit.

17. A switching power supply circuit, comprising:
a power circuit;
a switching circuit including a first filter module, a power processing unit, a stability module, and a second filter module; and
a load;
wherein the second filter module includes a loop; the first filter module receives a voltage signal from the power circuit and sends a filtered first voltage signal to the power processing unit; the power processing unit outputs a second voltage signal, the stability module stabilizes the second voltage signal and sends a third voltage signal to the second filter module; the second filter module filters the third voltage signal and sends a drive voltage to the load; and
in response to the second voltage signal instantaneously changing from high to low or low to high, during the change in current, power of the second voltage signal is stored in the stability module and released through the loop.

18. The switching power supply circuit as claimed in claim 17, wherein the power processing unit includes an output terminal and a ground, and the stability module includes a first inductor, a first capacitor and a first resistor connected in series between the output terminal and the ground.

19. The switching power supply circuit as claimed in claim 18, wherein the loop includes a second inductor, a second capacitor, and a diode; the first inductor and the second inductor are connected in series, the diode and the first capacitor are connected in parallel.

20. The switching power supply circuit as claimed in claim 19, wherein the diode is a zener diode.

21. The switching power supply circuit as claimed in claim 18, wherein the loop includes a diode, a transformer, and a second capacitor; the diode is connected to the first inductor.

22. The switching power supply circuit as claimed in claim 21, wherein the diode is a zener diode.

23. The switching power supply circuit as claimed in claim 22, wherein the transformer includes a primary winding and a secondary winding; the primary winding includes a first terminal and a second terminal, the secondary winding includes a third terminal and a fourth terminal; the first terminal is connected to the zener diode; the second terminal is connected to an input terminal of the load; and the third terminal and the fourth terminal are both connected to the ground.

* * * * *